United States Patent

[11] 3,542,305

[72] Inventor Louis B. Feierabend
Boulder, Colorado
[22] Filed Oct. 29, 1968
[45] Patented Nov. 24, 1970
[73] Assignee International Business Machines Corporation
Armonk, New York
a corporation of New York

[54] SELF-POSITIONING REEL LATCHING APPARATUS
12 Claims, 8 Drawing Figs.

[52] U.S. Cl. .......... 242/68.3
[51] Int. Cl. .......... B65h 17/02
[50] Field of Search .......... 242/68.3, 72

[56] References Cited
UNITED STATES PATENTS

| | | | |
|---|---|---|---|
| 1,946,455 | 2/1934 | Davis | 287/52.07 |
| 2,882,078 | 4/1959 | MacDonald | 242/68.3 |
| 2,928,620 | 3/1960 | Stavrakis | 242/68.3 |
| 3,053,466 | 9/1962 | Rehklau | 242/68.3 |
| 3,058,686 | 10/1962 | Field | 242/68.3 |
| 3,278,133 | 10/1966 | Froelich | 242/68.3 |
| 3,379,388 | 4/1968 | Gruczelak | 242/68.3 |

*Primary Examiner*—Nathan L. Mintz
*Attorney*—John E. Reilly

ABSTRACT: Axial positioning and alignment of a magnetic tape reel on a motor driven reel hub is brought about automatically by an improved reel positioning mechanism in which a shiftable camming device positively urges a plurality of radial positioning members outwardly beyond the inner surface of the reel, and a floating carrier for the positioning members is spring-loaded to drive the extended positioning members back against the reel into accurate alignment with the reel hub prior to latching of the reel to the reel hub.

Patented Nov. 24, 1970 3,542,305

INVENTOR
LOUIS B. FEIERABEND
BY John E. Reilly
ATTORNEY

SELF-POSITIONING REEL LATCHING APPARATUS

This invention relates to novel and improved reel latching devices and more particularly to latching devices adaptable for releasably positioning and latching magnetic tape reels on a motor driven shaft in a reliable and efficient manner.

It has been proposed in the past to employ automatic latching mechanisms capable of latching a magnetic tape reel against rotational slippage with respect to a motor drive shaft; and, for example, attention is directed to the U.S. Pat. to Froehlich No. 3,278,133, entitled "Tape Reel Latch", assigned to the assignee of the present invention for its disclosure of a reel hub latching mechanism. In addition, copending application for patent, Ser. No. 771,597, filed Oct. 29, 1968, now U.S. Pat. No. 3,532,286, entitled "Positive Seating Reel Latching Apparatus", and assigned to the assignee of the present invention, sets forth and describes an improved reel positioning and latching mechanism in which the reel is axially positioned in exact alinement with the reel hub as a preliminary to latching of the reel in place in the manner disclosed in the aforesaid U.S. Pat. to Froehlich No. 3,278,133.

It is now proposed in accordance with the present invention to provide for a novel and improved mechanism in which the reel is sequentially positioned and latched in place under the control of a common lever or handle, the mechanism requiring the least number of parts which can be easily assembled to assure positive and reliable axial positioning of the reel in exact true alinement with the hub and latching or expansion member.

It is therefore an object of the present invention to provide for a novel and improved self-positioning reel latching device being adaptable for use in latching magnetic tape reels and cartridges for rotation on a motor driven shaft.

It is another object to provide for a reel latching apparatus requiring a minimum number of parts which are cooperative to sequentially position and lock a reel in place on a hub at the end of a drive shaft automatically in response to movement of a common control member and wherein the apparatus obviates the use of auxiliary locating elements to assure initial positioning of the reel in alinement on the hub.

It is a further object of the present invention to provide in a tape reel latching apparatus for a reel positioning assembly having a common carrier to guide outward radial extension of a plurality of positioning members beyond the periphery of the hub followed by application of a strong axial driving force to the positioning members causing them to be positively but resiliently urged against the side of the reel to accurately aline the reel on a hub section of the latching apparatus.

It is an additional object of the present invention to provide for a reel latching apparatus which is readily conformable for use with different types and sizes of drive shafts having an improved shaft mounting for quick, reliable assembly of the mechanism into exact desired alinement on the shaft and in turn assures positive but releasable latching of a tape reel in predetermined relation to the shaft.

The present invention may be best exemplified by reference to the tape reel latch set forth and described in the aforesaid U.S. Pat. No. 3,278,133 wherein the hub section is provided with an outer expansion ring which is radially expanded into latching engagement with the inner surface of the tape reel by axial advancement of a shiftable cover or cassette against one side of the ring. In preferred and alternate forms of this invention, it is highly desirable to initially position the reel on the hub in exact alinement with the ring prior to expansion of the latter into latching engagement with the reel; and, to this end, a reel positioning assembly is disposed between the cover and hub having radial positioning elements slidably supported on a carrier. Under initial closing movement of the cover towards the hub, the positioning elements are expanded outwardly beyond the periphery of the hub and thereafter are advanced rearwardly against the tape reel by application of a substantial driving force to the carrier. The carrier is resiliently supported in surrounding relation to the drive shaft, or to an extension of the drive shaft, and a high strength spring device is responsive to axial movement of the cover to engage the carrier and overcome its resilient support in forcing the positioning members axially toward the reel. Under continued movement of the cover, a cam ring on the cover is advanced against the side of the expansion ring to force the ring into firm frictional engagement with the inner surface of the reel. Conversely when the cover is released the drive spring will urge the cover away from the expansion ring and carrier, and the carrier will be returned to its initial position by its resilient support while the positioning members are returned to a normally retracted position within the cover to permit release or removal of the reel. For the reason that the reel positioning members are first advanced solely in a radial direction in spaced relation to the hub, the use or need for auxiliary locating elements to assure initial alinement of the reel on the hub is avoided.

The foregoing and other objects, advantages and features of the invention will be apparent from the following more particular description of preferred and alternate embodiments of the invention, as illustrated in the accompanying drawings.

Figures 1, 2:
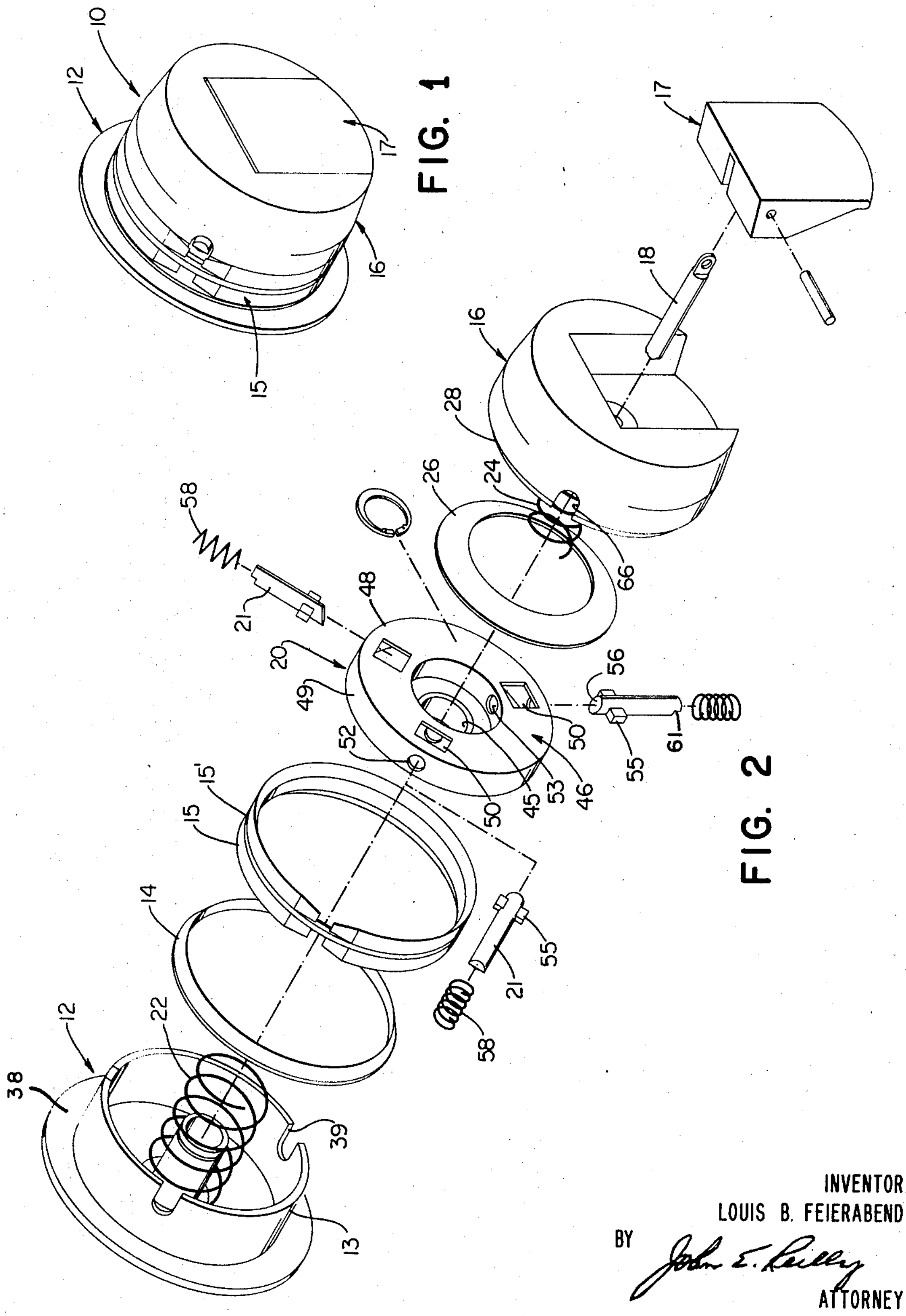
FIG. 1 is a perspective view of a preferred form of the present invention.
FIG. 2 is an exploded view illustrating the relative disposition of components of the preferred form of the present invention.

Referring in more detail to the drawings, a preferred form of reel latching apparatus 10 is shown in FIGS. 1 to 6, and is broadly comprised of a reel hub section 12 provided with an outer seating portion 13 which is adapted to receive a circular wedge member 14 and expansion mandrel or ring 15. A shiftable cover assembly 16 includes a lever or handle 17 to control axial shifting or movement of the cover along an anchor rod 18 which forms an extension of a drive shaft, not shown, toward and away from the reel hub section. In turn, a reel positioning assembly 20 is resiliently suspended by the axially opposed urging of springs 22 and 24 between the reel hub section 12 and cover assembly 16, the spring 22 being mounted under compression between the hub section 12 and positioning assembly 20 and the spring 24 being mounted under compression between the cover assembly 16 and forward end of the hub section 12. First and second cam actuating members take the form of cam ring 25 and a disk spring 26, respectively, which are mounted within the cover assembly 16. Generally, under axial displacement of the cover 16 toward the reel hub section 12 the first cam actuating member 25 will cause outward radial extension of locking or positioning members 21, and the second cam actuating member 26 then will drive the entire assembly 20 including the positioning members 21 axially toward the reel hub section and against the side of a tape reel T positioned on the reel hub.

Figures 5, 6:
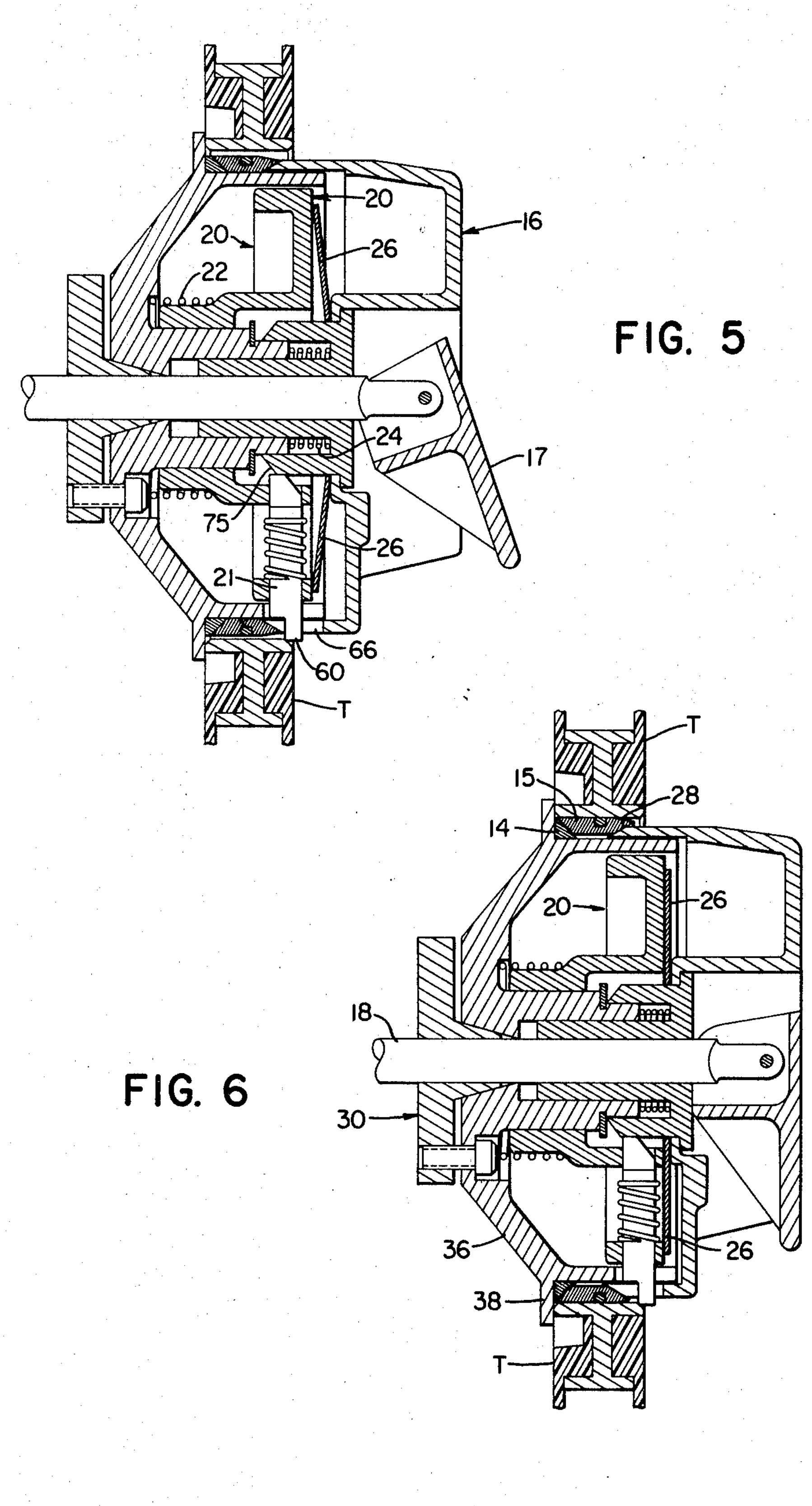
FIG. 5 is an enlarged cross-sectional view in elevation corresponding to FIGS. 3 and 4 showing the relationship between parts under continued advancement of the cover toward the closed position and specifically with the reel axially positioned in place.
FIG. 6 is an enlarged cross-sectional view corresponding to FIGS. 3—5 and showing the assembly in the closed or latched position.

The construction and arrangement of the expansion ring 15 corresponds to that disclosed in the aforesaid U.S. Pat. to Froehlich No. 3,278,133 and reference is made to that patent for a discussion of its specific advantages and features. Essentially, the expansion ring 15 includes a split ring or mandrel having tapered side faces, and a circumferential groove or notch in the external surface of the mandrel is sized to receive an endless metal band 15'. In order to cause radial expansion of the ring 15 from the position shown in FIG. 3, into the latching position shown in FIG. 6, the wedge member 14 has a tapered face complementary to the tapered side face of the ring 15, and a tapered cam face 28 at the open end of the cover 16 is complementary to the opposite side of the expansion ring 15. In this way, when the cam face 28 is axially advanced against the side of the ring it will compressively wedge the ring against the wedge 14 to effect outward radial expansion of the ring against the inner surface of the reel as shown in FIG. 6.

The reel hub section is permanently affixed to a bushing 30 which is in turn keyed or otherwise fixed for rotation with the anchor rod 18, the latter forming an axial extension of a motor driven shaft for a tape reel. Here the bushing is provided with an end plate 31 and a conical projection 32; and the relatively thick inner end portion 33 of the hub is provided with a generally conical bore for insertion of the projection 32 with a series of bolt holes being spaced around the end of the hub to permit fixed connection between the hub and the end plate 31 by suitable bolts represented at 34. A wall section 36 inclines forwardly from the inner end portion and terminates in an outer cylindrical wall 37 which together with a locating flange 38 defines the seat portion 13 for the tape reel T. Open slots 39 in the wall 37 permit radial extension of the bolts 21 from the carrier to be hereinafter described in more detail. In addition, an inner tubular wall portion 40 projects forwardly from the inner end portion 33 in outer spaced concentric relation to the anchor rod 18 and is provided with an external shoulder 41 and associated external groove to receive a retaining ring 42 which in a manner to be described supports the reel positioning assembly 20.

The reel positioning assembly 20 includes a rearwardly extending sleeve 45 terminating in surrounding relation to the wall portion 40 of the hub, and a carrier portion 46 at the forward end of the sleeve is generally U-shaped in cross section and is formed of a circular web 48 having a skirt 49 extending rearwardly from its outer peripheral edge adjacent to the inner wall surface of the seat portion 13. As shown in FIG. 2, the web 48 is provided with rectangular slots 50 at equally spaced circumferential intervals, and the skirt 49 has spaced circular openings 52 which are alined with openings 53 in the inner sleeve 45 of the carrier for the purpose of receiving opposite ends of the reel positioning members 21.

It will be observed that each locking member 21 takes the web 48 of a radial bolt, cylindrical in cross section, having an inner beveled cam surface 56 and transverse ears 55 adjacent to its inner end. The ears serve the dual function of alining the beveled cam surface 56 in facing relation to the cam actuating member 25 and of limiting inward movement of the bolt under the urging of a coiled spring element 58, the latter being positioned on the bolt and biased against the inner surface of the skirt 49. The outer, leading end 60 of each bolt is notched as at 61 and, under the biasing of the spring 58, is normally disposed to lie within or flush with the peripheral wall of the cover assembly 16. The slots 50 in the web 48 merely afford adequate clearance for free movement of the spring elements 58 in controlling the radial movement of the bolts.

Figure 3:
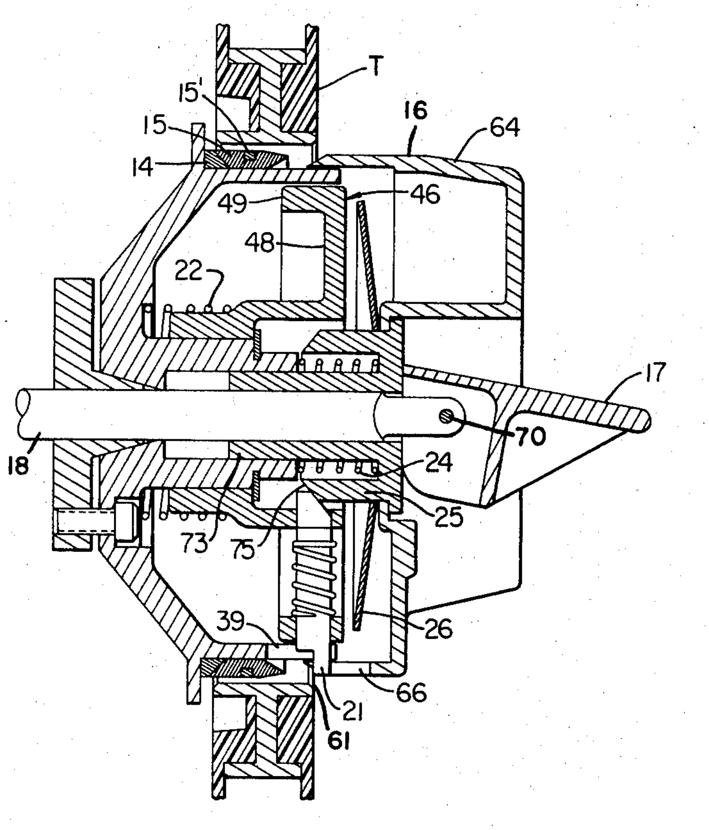
FIG. 3 is an enlarged cross-sectional view in elevation of the preferred form of invention and illustrating the interrelationship between parts in the released or open position.

The cover 16 is of generally cup-shaped configuration having an outer cylindrical wall 64 diverging rearwardly away from closed end 65 and terminating in the circular cam face 28 at its rearward, open end. Rearwardly opening slots 66 in the wall 64 are alined with the slots 52 in the skirt portion of the carrier for outward extension of the radial bolts 21. The closed end of the cover is recessed as at 68 for mounting of the cam lever 17 in pivotal relation to the angular end 69 of the anchor rod 18 by pivot pin 70 so that the cam lever is free to move from an extended, open position, as shown in FIG. 3, to a closed position flush with the end of the cover, as shown in FIG. 6. In order to secure the cover for free axial movement along the anchor rod 18, a guide bushing 72 is disposed in a central opening formed centrally of the cover within the recessed portion 68. The bushing includes an inner sleeve 73 which is slidable through the annular space formed between the anchor rod and the wall section 40 of the hub and a spaced outer concentric cam ring, defining the cam actuating member 25, which has a tapered cam face 75 at its rearward end slidable through the space formed between the sleeve 45 of the carrier and the forward end of the wall 40 of the hub section to make engagement with the end surface 56 at the inner end of each of the radial bolt members 21. The return spring 24 is mounted under compression within the space formed between the bushing and the wall portion 40 of the hub section with opposite ends abutting the forward end of the wall portion 40 and the inner end surface of the bushing so that the cover assembly 16 is normally biased in a direction away from the hub section. Similarly, the return spring 22 for the carrier is mounted in surrounding relation to the sleeve 45 with one end of the spring abutting the inner end portion of the hub and the opposite end abutting an external shoulder on the sleeve 45 so as to urge the carrier forwardly against the retaining ring 42. The annular disk spring 26 is placed over the external surface of the bushing within the cover assembly and diverges rearwardly to terminate in an outer peripheral edge located near the outer skirt portion 49 of the carrier.

As shown in FIG. 3, the tape reel T can be passed over the cover assembly and loosely placed on the seat portion when the cam lever is in its open position and the bolts 21 are normally retracted within the cover assembly. In this relation, the disk spring 26 is spaced forwardly of the carrier, the carrier in turn is resiliently supported by the spring 22 in its forwardmost position, and the cover is separated from the expansion ring by its return spring 24 and with the cam face 75 contacting the beveled surface 56 on the slide bolts.

Figure 4:
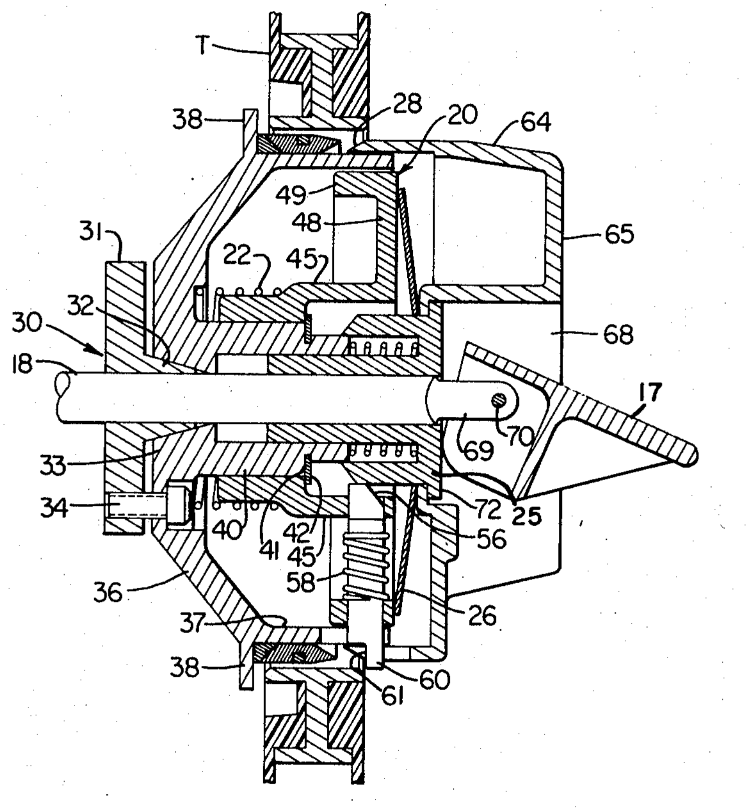
FIG. 4 is an enlarged cross-sectional view similar to FIG. 3 showing the interrelationship between parts under initial closing movement of the cover.

FIG. 4 illustrated outward radial displacement of the bolts 21 under initial closing movement of the cam lever 17 causing the cam faces 75 to advance rearwardly against the surfaces 56 at the inner ends of the bolts. Thus the bolts are urged outwardly in a radial direction through the slots in the cylindrical wall 64 of the cover and with the leading ends 60 of the bolts projecting beyond the inner peripheral wall surface of the tape reel. At this point it will be noted that the second cam actuating member as defined by disk spring 26 has made contact with the forward end of the carrier and, as shown in FIG. 5, will urge the entire carrier assembly in a rearward direction under continued closing movement of the cam lever 17. The tension of the spring is sufficiently great to overcome the urging of the spring 22 in forcing the carrier assembly rearwardly with the sleeve portion 45 being axially displaced along the tubular wall section 40 of the hub whereby to force the leading ends 60 of the bolt members 21 against the side of the reel and to urge the reel against the locating flange 38.

As illustrated in FIG. 6, final closing movement of the cam ever 17 will in a conventional manner force the cam face 28 against the one side of the expansion ring 15 whereby to wedge the ring between the cam face 28 and the wedging member 14 and expand the ring 15 outwardly against the inner peripheral surface of the reel. As the cam lever is advanced to the closed position, the disk spring 26 will increase the axial seating force of the bolts 21 against the reel as the ring 15 is expanded against the reel, until the spring assumes a fully collapsed or flattened position against the end surface of the carrier.

Figures 7, 8:
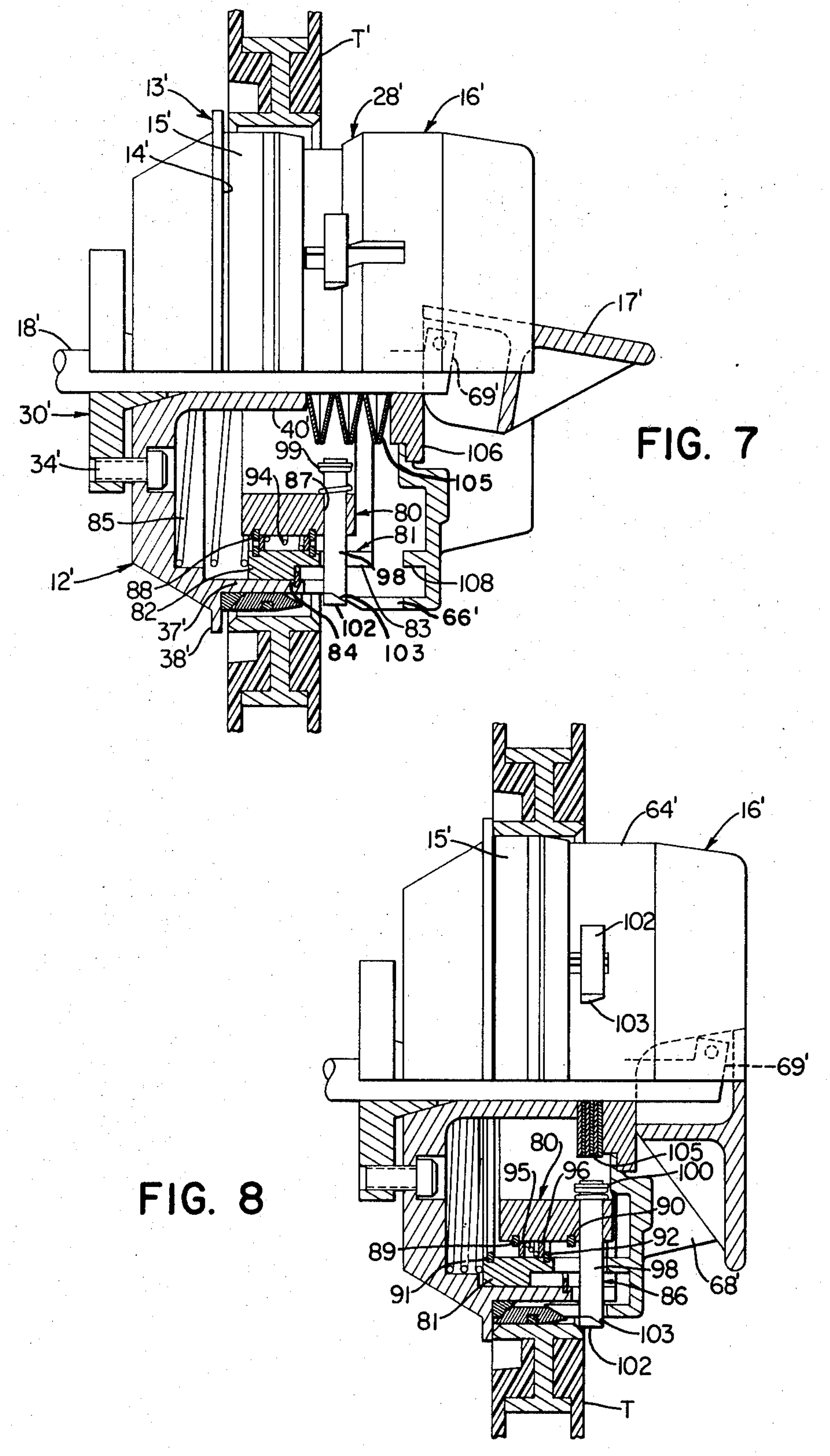
FIG. 7 is an elevational view partially in section of a modified form of the present invention showing the interrelationship between parts in the open or released position.
FIG. 8 is an elevational view partially in section showing the relationship between parts of the modified form of invention when in the closed position.

A modified form of invention is shown in FIG. 7 and 8 wherein like or similar elements and parts are correspondingly enumerated and designated with prime numbers. The general assemblage and arrangement between the major components is very much the same as that set forth in the preferred form and, broadly, is made up of a reel hub section 12' having an inner hub portion affixed to a conical bearing member 30' by bolts 34' but with the sleeve portion 40' sized for close-fitting insertion of the anchor rod 18'. Similarly, an outer reel seat portion 13' is defined by a cylindrical wall 37' with locating flange 38' and having a wedge member 14' and an expansion ring 15' mounted on the seat portion to engage the inner surface of the tape reel T'. In addition, the cover assembly 16' has an outer cylindrical cam face 28', and a cam lever 17' is pivotally mounted at the angular end 69' of the anchor rod 18' for movement between an open position, as shown in FIG. 7, to a closed position, as shown in FIG. 8, within the recessed portion 68' in the cover.

The modified form of bolt carrier assembly is comprised of spaced inner and outer concentric support rings 80 and 81, the outer ring 81 having a relatively thick end portion 82 and a relatively thin slotted portion 83 with an external shoulder therebetween. The outer ring 81 is biased forwardly against a retainer ring 84 by a spring member 85 mounted between the end of the hub section and the rearward end of the outer ring. The slotted portion 83 is provided with a plurality of open slots in its forward end surface and at equally spaced circumferential intervals to be alined with radial bores 87 in the inner ring for insertion of radial slide bolts 86.

The inner ring 80 is of a relatively thick, uniform cross section and is spaced within the outer ring by a double acting, spring-loaded assembly 88. It will be seen that the spring-loaded assembly 88 consists of axially spaced retainer rings 89 and 90 disposed in external grooves on the outer surface of the inner ring 80 and retainer rings 91 and 92 disposed in external grooves formed on the inner surface of the outer ring 81. A coil spring 94 is arranged between floating limit rings 95 and 96 which are normally urged against the retainer rings 89, 91 and 90, 92 between the inner and outer rings when the cover assembly is in the open position shown in FIG. 7.

Each of the radial slide bolts 86 is of generally T-shaped configuration having a cylindrical shank 98 passed through each of the alined slots 81 and bores 87, and each bolt is resiliently held in place by spring 99 acting between the inner surface of the cam ring 80 and a limit stop 100 at the inner extremity of the shank. The leading end of the shank 98 is provided with a cross bar 102 having a wide tapered cam face 103 along its forward edge, and the bars 102 are wider than the open slots 66' in the cylindrical wall of the cover assembly in order to limit inward extension of the slide bolts.

The cover assembly 16' is slidably disposed on the anchor rod 18' and is biased toward the open position by a return spring assembly 105 which consists of a series of disk springs, oppositely directed to one another, interpositioned between the forward end of the sleeve 40' on the hub section and the rearward end of a bearing 106 in the closed end of the cover assembly. Additionally, the closed end of the cover is provided with a rearwardly directed cam ring 108 spaced in inner concentric relation to the outer cylindrical wall 64' of the cover assembly.

In practice, the tape reel is passed over the cover assembly into position of the reel seat portion when the cover assembly is in the open position shown in FIG. 7 with the leading ends of the slide bolts retracted against the external surface of the hub and the cam face 103 retracted against the leading edge of the cam face 28'. As the cam lever 17' is initially advanced toward the closed position, the cam face 28' immediately will advance rearwardly against the cam faces 103 on the slide bolts thereby urging the slide bolts simultaneously in an outward radial direction beyond, but in spaced relation forwardly of, the tape reel. Under continued advancement of the cam lever, the cam ring 108 will abut the forward end of the outer cam-engaging ring 81 to drive the ring 81 rearwardly against the urging of the spring 85. Rearward displacement of the ring 81 will compress the spring 94 and, under sufficient compression, the inner cam-engaging ring 80 will translate rearward displacement of the outer ring to axially displace the slide bolts 86 against the side of the tape reel whereby to force the tape reel against the locating flange 38', as best seen from FIG. 8.

As the cam lever 17' approaches the closed position it will in a conventional manner compressively wedge the radial expansion ring 15' against the wedge member 14' and expand it radially against the inner surface of the tape reel to complete the latching operation. Thus the modified form achieves the same end result as the preferred form in sequentially displacing the slide bolts in an outward radial direction followed by axial displacement against the tape reel, and later followed by outward radial expansion of the expansion ring against the inner surface of the reel. Again, since the slide bolts are first caused to move on a straight radial line into spaced relation with the tape reel, initial alinement of the tape reel on the seat portion is not critical. Moreover, the slide bolts serve the dual purpose of assuring proper initial alinement of the tape reel on the seat portion since, if the tape reel has not fully cleared the slide bolts when initially positioned on the latch device, the slide bolts will be incapable of extending outwardly a sufficient distance to permit the cam face 28' to advance past the slide bolts into engagement with the expansion ring; and as a result will interfere with the closing movement of the cam lever to indicate improper placement of the reel to the operator.

In order to release the tape reel from the latch mechanism it is merely necessary to grasp the handle on the cam lever and lift away from the closed position whereupon the return spring assembly 105 will actively force the cover to follow the opening movement of the cam lever and the return spring 85 will urge the outer ring 81 forwardly against the ring 84 while the inner ring 80 and slide bolts are urged forwardly by the spring 94. At the same time, the return springs 99 at the inner ends of the slide bolts will retract the bolts inwardly against the external surface of the seating portion.

It will be evident from the foregoing that in both the preferred and alternate forms of invention mounting and removal of the tape reel can be carried out in a rapid dependable manner. For example, in latching the tape reel in place, it is necessary merely to slip the reel over the seat portion and to grasp the cam lever with one hand and force it inwardly towards the closed position to latch the reel in place. Similarly, to release the reel the cam lever is opened with one hand and the reel easily slipped off. Further, in each form, a minimum number of parts is required to sequentially position and latch the reel and the parts can be easily assembled and disassembled and are relatively free of maintenance.

While the invention has been particularly shown and described with reference to preferred and alternate embodiments thereof, it will be understood by those skilled in the art that various changes in form and details may be made without departing from the spirit and scope of the invention.

I claim:

1. In a reel latching apparatus having a reel hub mounted on a drive shaft and a generally cylindrical reel seat portion for placement of a reel thereon, said seat portion including an expansion member adapted to latch the tape reel to said seat portion for rotation by the drive shaft, the combination therewith of:

- a carrier including a plurality of reel positioning members movable in a radial direction independently of said carrier, and said carrier being displaceable to advance said reel positioning members axially toward said reel seat portion; and
- a shiftable cam including actuating means to sequentially advance said reel positioning members in a radial direction outwardly beyond the inner peripheral surface of the tape reel when the tape reel is placed on said seat portion to engage said carrier for advancement of said reel positioning members axially against the tape reel whereby to axially position the tape reel in alinement with the expansion member and thereafter to force said expansion member into latching engagement with the reel.

2. In a reel latching apparatus according to claim 1, said shiftable cam being displaceable axially of said drive shaft in one continuous movement toward said reel seat portion to sequentially position and latch the reel to said seat portion.

3. In a reel latching apparatus according to claim 1, said carrier being interposed between said hub and said shiftable cam, and said reel positioning members being in the form of radial bolts slidably disposed on said carrier for radial extension outwardly from a normally retracted position inwardly of the inner periphery of the reel to an extended position beyond the inner periphery of the reel.

4. In a reel latching apparatus according to claim 2, said actuating means being defined by a first cam actuating member engageable with a cam surface at the inner end of each radial bolt to impart radial outward sliding movement thereto, and a second cam actuating member engageable with said carrier to impart axial movement thereto under axial displacement of said shiftable cam toward said reel seat portion.

5. In a reel latching apparatus according to claim 4, said second cam actuating member being defined by a disk spring diverging rearwardly from said shiftable cam toward said carrier to resiliently urge said carrier rearwardly under rearward axial displacement of said shiftable cam.

6. In a reel latching apparatus according to claim 3, said radial slide bolts each having a cam-engaging portion at its outer end and said shiftable cam including an outer cam ring sequentially movable against said cam-engaging portion to urge said slide bolts in an outward radial direction and further movable to force said expansion member into latching engagement with the tape reel.

7. In a reel latching apparatus according to claim 6, said carrier being defined by inner and outer support rings having a double-acting spring-loaded assembly therebetween, and said shiftable cam including an actuating member movable against one of said support rings to resiliently urge the other of said support rings and said radial bolts rearwardly against the reel under axial displacement of said shiftable cam.

8. A reel latching apparatus for positioning and latching a magnetic tape reel and the like on a motor drive shaft comprising in combination:

a reel hub including a reel seat portion mounted on said drive shaft and an expansion ring concentrically disposed on said seat portion, a locating flange on said seat portion and a wedge member extending forwardly from said flange for engagement with one side of said expansion ring;

a cover mounted on said drive shaft in axially spaced relation to said reel hub having cam actuating members thereon axially displaceable toward said reel seat portion;

a carrier resiliently supported on the drive shaft between said reel hub and said cover including radially extending reel positioning bolts disposed at equally spaced circumferential intervals on said carrier, each reel positioning bolt having resilient means biasing each bolt inwardly to a normally retracted position and a cam-engaging surface in the path of one of said cam actuating members; and a cam lever pivotally mounted on said drive shaft for movement axially against said cover in a direction forcing said cam actuating members toward said reel hub with one of said cam actuating members first engaging the cam-engaging surfaces to urge said reel positioning bolts in an outward radial direction beyond the inner periphery of said tape reel followed by engagement of the other of said cam actuating members with said carrier to cause axial displacement of said reel positioning bolts against the tape reel until the reel is positioned against the locating flange on said reel seat portion.

9. A reel latching apparatus according to claim 8 wherein the one cam actuating member is defined by an annular projection extending rearwardly from said cover toward the cam-engaging surfaces on said radial positioning bolts and the other of said cam actuating members being defined by a disk spring mounted within said cover and diverging rearwardly toward said carrier to resiliently engage said carrier when said cover is axially advanced toward said reel seat portion 10. A reel latching apparatus according to claim 9, said cover being generally cup-shaped in configuration having a rearwardly directed circular cam face movable into engagement with said expansion ring following axial displacement of said reel positioning bolts in forcing the tape reel against the locating flange on said reel seat portion.

11. A reel latching apparatus according to claim 8 wherein said one cam actuating member is defined by a circular cam face at the rearward end of said cover sequentially engageable with the outer leading ends of cam-engaging surfaces on said radial positioning bolts and with a side of said expansion ring opposite said wedge member, and the other of said cam actuating members is defined by an annular projection extending rearwardly from within said cover for engagement with said carrier.

12. A reel latching apparatus according to claim 8, said carrier being defined by inner and outer support rings having a double-acting spring-loaded assembly therebetween, said radial positioning bolts extending through alined openings in said inner and outer support rings, means on said reel hub resiliently supporting one of said support rings, and said shiftable cam having an actuating member movable against the other of said support rings to urge said other support ring rearwardly for a distance causing said spring-loaded assembly to overcome said resilient support means on said one support ring and to resiliently urge said one support ring rearwardly for axial displacement of said positioning bolts against the tape reel.

PO-1050
(5/69)

UNITED STATES PATENT OFFICE
CERTIFICATE OF CORRECTION

Patent No. 3,542,305 Dated November 24, 1970

Inventor(s) Louis B. Feierabend

It is certified that error appears in the above-identified patent and that said Letters Patent are hereby corrected as shown below:

On the front page, between data element identifiers [7 and [22] insert --[21] Appl. No. 771,596--.

Column 4, line 36, the word "illustrated" should read --illustrates--.

Signed and sealed this 20th day of July 1971.

(SEAL)
Attest:

EDWARD M.FLETCHER,JR.
Attesting Officer

WILLIAM E. SCHUYLER,JR.
Commissioner of Patents